(12) United States Patent
Nishidate

(10) Patent No.: US 9,274,702 B2
(45) Date of Patent: Mar. 1, 2016

(54) DRAWING DEVICE, DRAWING CONTROL METHOD, AND DRAWING CONTROL PROGRAM FOR DRAWING GRAPHICS IN ACCORDANCE WITH INPUT THROUGH INPUT DEVICE THAT ALLOWS FOR INPUT AT MULTIPLE POINTS

(75) Inventor: Masaomi Nishidate, Tokyo (JP)

(73) Assignees: SPNY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 496 days.

(21) Appl. No.: 13/609,506

(22) Filed: Sep. 11, 2012

(65) Prior Publication Data

US 2013/0093664 A1   Apr. 18, 2013

(30) Foreign Application Priority Data

Oct. 18, 2011   (JP) ................................. 2011-229067

(51) Int. Cl.
G06F 3/0488   (2013.01)

(52) U.S. Cl.
CPC .. *G06F 3/04883* (2013.01); *G06F 2203/04808* (2013.01)

(58) Field of Classification Search
None
See application file for complete search history.

(56) References Cited

U.S. PATENT DOCUMENTS

2003/0071858 A1*   4/2003   Morohoshi ................... 345/856

FOREIGN PATENT DOCUMENTS

| JP | 4-25929 | 1/1992 |
|----|---------|--------|
| JP | 2001-134382 | 5/2001 |
| JP | 2002-304256 | 10/2002 |
| JP | 2003-173237 | 6/2003 |
| JP | 2007-141029 | 6/2007 |
| JP | 2010-108061 | 5/2010 |

OTHER PUBLICATIONS

Notification of Reason(s) for Refusal dated Jul. 23, 2013, from corresponding Japanese Application No. 2011-229067.

* cited by examiner

*Primary Examiner* — Kenneth B Lee, Jr.
(74) *Attorney, Agent, or Firm* — Katten Muchin Rosenman LLP

(57) ABSTRACT

A game device includes: an input position acquiring unit for acquiring the position of an input entry to a touch panel capable of concurrently detecting input entries at a plurality of points; a drawing start determination unit for determining, when the respective positions of concurrent input entries to the touch panel at two points are acquired, to start drawing a graphic if a distance between the two points is within a first range; a drawing unit for drawing, while the input entries at the two points continue to be input after drawing a graphic is started, a graphic calculated based on the respective movement trajectories of the two points and displaying the graphic on a display device; and a drawing end determination unit for determining to end drawing the graphic when the input of the input entries at the two points ends.

18 Claims, 13 Drawing Sheets

DRAWING DEVICE, DRAWING CONTROL METHOD, AND DRAWING CONTROL PROGRAM FOR DRAWING GRAPHICS IN ACCORDANCE WITH INPUT THROUGH INPUT DEVICE THAT ALLOWS FOR INPUT AT MULTIPLE POINTS

BACKGROUND OF THE INVENTION

1. Field of the Invention

The present invention relates to a drawing technology and, more particularly, to a drawing device, a drawing control method, and a drawing control program for drawing graphics in accordance with input through an input device such as a touch panel.

2. Description of the Related Art

Information terminals and game devices provided with touch panels have become widely used. Various types of applications have been provided that take advantage of the characteristics of touch panels that allow for operation by directly touching with fingers a screen displayed on a display device.

The present applicant has developed portable game terminals provided with a touch panel that allows for input entries at a plurality of points, a rear touch panel provided on the back surface of the game terminal, and the like. The present inventor has conceived of new drawing control technologies that take advantage of the characteristics of such new terminals.

SUMMARY OF THE INVENTION

In this background, a purpose of the present invention is to provide drawing technologies with high user-friendliness.

An embodiment of the present invention relates to a control program. The game control program allows a computer to function as: an acquiring unit for acquiring the position of an input entry to an input device capable of concurrently detecting input entries at a plurality of points; a drawing start determination unit for determining, when the acquiring unit acquires the respective positions of concurrent input entries to the input device at two points, to start drawing a graphic if a distance between the two points is within a first range; a drawing unit for drawing, while the input entries at the two points continue to be input after the drawing start determination unit determines to start drawing a graphic, a graphic calculated based on the respective movement trajectories of the two points and displaying the graphic on a display device; and a drawing end determination unit for determining, when the input of the input entries at the two points ends, to end drawing the graphic.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

A game device according to an embodiment is an example of a drawing device, and the game device draws a graphic in accordance with continuous input to a touch panel at two points. An explanation is first given regarding a function of displaying a pen-shaped cursor on a screen of a display device and, when a user touches a touch panel in such a way as if the user holds the cursor with two fingers and then moves the fingers, allowing the cursor to move according to the movement of the fingers so as to draw the movement trajectory of the tip of the pen as a graphic in a first embodiment. An explanation is then given regarding a function of drawing a graphic surrounded by a line connecting the two points and the respective movement trajectories of the two points moved while the user kept touching the touch panel in a second embodiment.

First Embodiment

Figure 1:
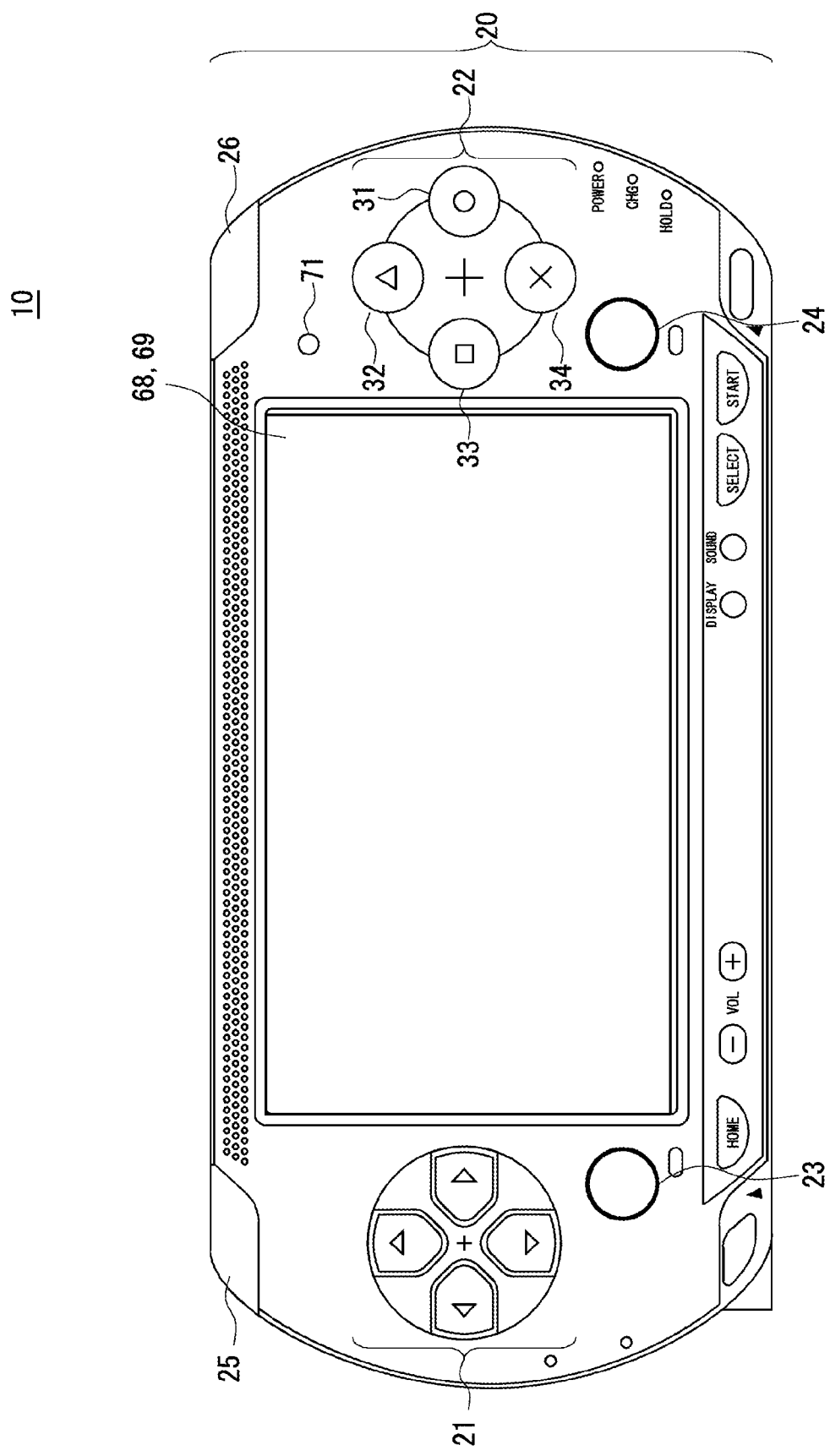
FIG. 1 is a diagram illustrating the exterior view of a game device according to an embodiment.
Figure 2:
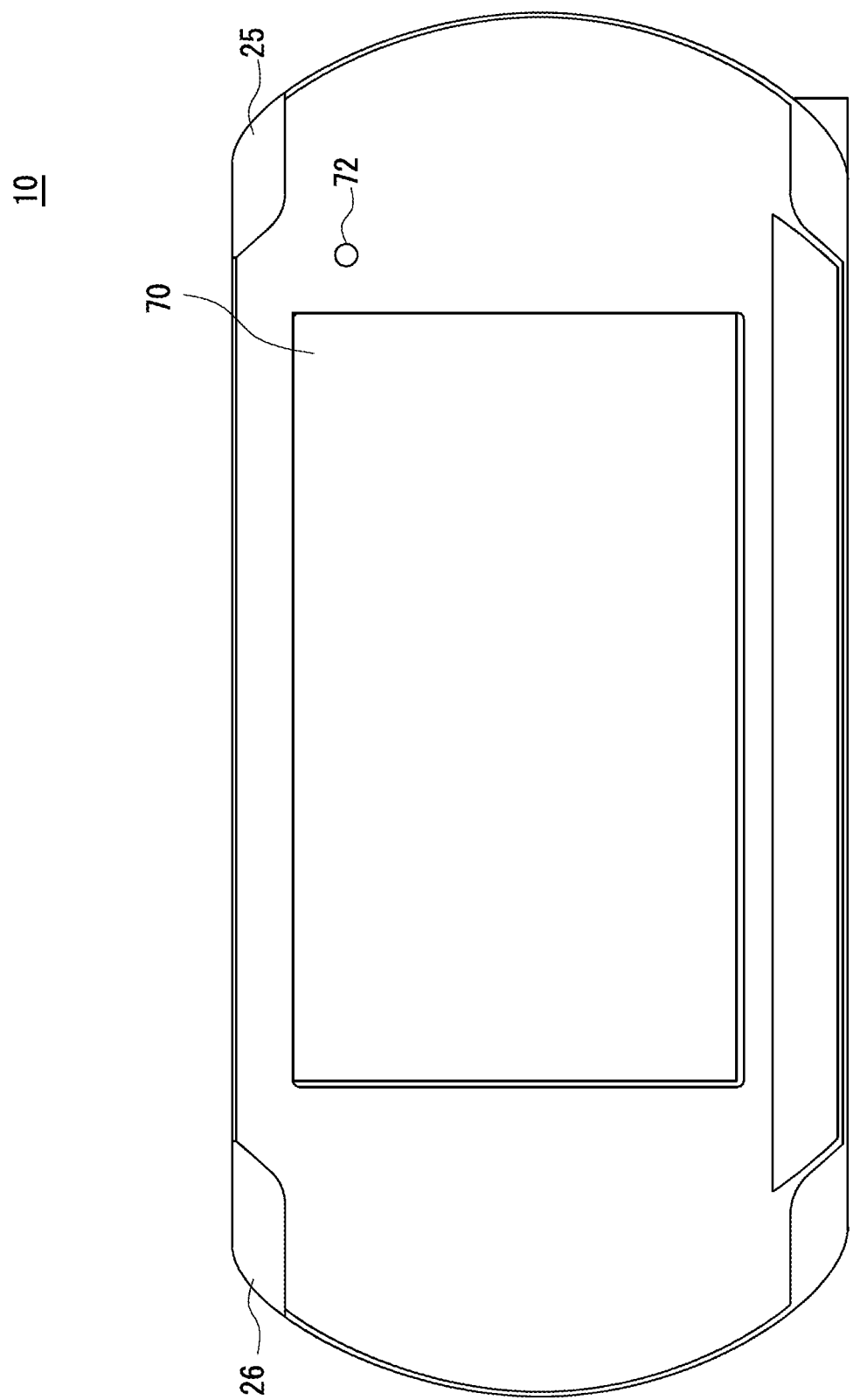
FIG. 2 is a diagram illustrating the exterior view of the game device according to the embodiment.

FIGS. 1 and 2 show the exterior view of a game device 10 according to an embodiment. The game device 10 shown in FIGS. 1 and 2 is a portable game device designed to be held by the player for use. As shown in FIG. 1, the front face of the game device 10, i.e., the side facing the player as the player holds and controls the game device 10, is provided with an input device 20 comprising directional keys 21, buttons 22, a left analog stick 23, a right analog stick 24, a left button 25, and a right button 26 and is also provided with a display device 68 and a front camera 71. The display device 68 is provided with a touch panel 69 for detecting contact by the player's finger, a stylus pen, or the like. The buttons 22 include a circle button 31, a triangle button 32, a square button 33, and a cross button 34.

As shown in FIG. 2, the back of the game device 10 is provided with a rear touch panel 70 and a rear camera 72. A display device may be provided on the back of the game device 10 similarly to the front face. In this embodiment, a display device is not provided on the back of the game device 10, and only a rear touch panel 70 is provided.

The player holding the game device 10 with both hands can manipulate the button 22 with the right thumb, manipulate the directional keys 21 with the left thumb, manipulate the right button 26 with the right index finger or middle finger, manipulate the left button 25 with the left index finger or middle finger, manipulate the touch panel 69 with both thumbs, and manipulate the rear touch panel 70 with both ring fingers or little fingers. When using a stylus pen, or the like, for example, the player holding the game device 10 with the left hand can manipulate the touch panel 69 and the buttons 22 with the stylus pen using the right hand or the index finger, manipulate the directional keys 21 with the left thumb, manipulate the left button 25 with the left index finger or middle finger, and manipulate the rear touch panel 70 with the left ring finger or little finger.

Figure 3:
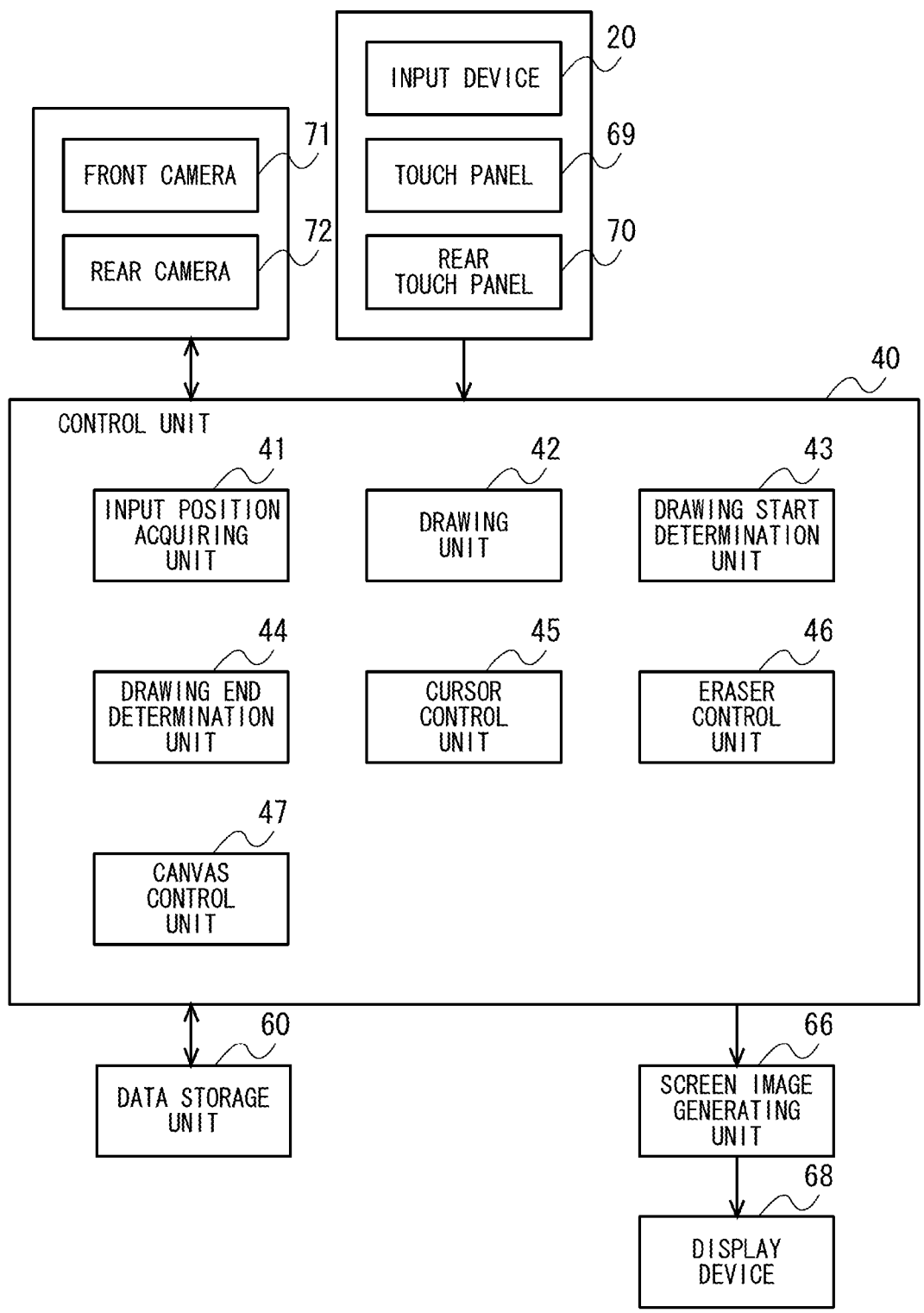
FIG. 3 is a diagram illustrating the configuration of the game device according to the embodiment.

FIG. 3 illustrates the configuration of the game device 10 according to the embodiment. The game device 10 comprises an input device 20, a control unit 40, a data storage unit 60, a screen image generating unit 66, a display device 68, a touch panel 69, a rear touch panel 70, a front camera 71, and a rear camera 72. These configurations are implemented in hardware component by any CPU of a computer, a memory or a program loaded into the memory. Functional blocks are implemented by the cooperation of hardware components. Thus, a person skilled in the art should appreciate that there are many ways of accomplishing these functional blocks in various forms in accordance with the components of hardware only, software only, or the combination of both.

The front camera 71 captures the image of the front of the game device 10. The rear camera 72 captures the image of the back of the game device 10.

The touch panel 69 may be a touch panel of any type such as a touch panel of matrix switch type, resistance film type, surface acoustic wave type, infrared type, electromagnetic induction type, electrical capacitance type, or the like. The touch panel 69 can concurrently detect input entries at a plurality of points. The touch panel 69 outputs, at predetermined intervals, the coordinates of a position at which an input entry is detected.

The rear touch panel 70 may also be a touch panel of any type. The rear touch panel 70 is capable of detecting the strength of an input entry. The rear touch panel 70 may comprise a pressure sensitive sensor capable of detecting the pressure of a pressing force onto the rear touch panel 70. Alternatively, the rear touch panel 70 may calculate the strength of an input entry on the basis of the size, voltage value, electrostatic capacitance, or the like of an area where the entry is detected. The rear touch panel 70 outputs the coordinates of a position at which an input entry is detected and the strength (pressure) of the input entry at predetermined intervals.

The control unit 40 reads out a program from a recording medium or the like that stores a drawing control program according to an embodiment, executes the program, and allows drawing to progress on the basis of instruction input entered from the input device 20, the touch panel 69, and the rear touch panel 70. The screen image generating unit 66 generates a screen image of a drawing control program controlled by the control unit 40 and allows the display device 68 to display the screen image. The data storage unit 60 stores image data of a cursor, etc., data necessary for drawing graphics, data of a graphic being drawn, and the like.

The control unit 40 includes an input position acquiring unit 41, a drawing unit 42, a drawing start determination unit 43, a drawing end determination unit 44, a cursor control unit 45, an eraser control unit 46, and a canvas control unit 47.

The input position acquiring unit 41 acquires the coordinates of the position of an input entry to the touch panel 69 and an input entry to the rear touch panel 70, the input entries being provided by the user. The position of an input entry provided by the user and detected by the touch panel 69 or the rear touch panel 70 may be calculated by a device driver or the like (not shown) provided in the touch panel 69 and the rear touch panel 70, or in the control unit 40. The input position acquiring unit 41 may acquire information on the position calculated by the device driver or the like.

When the input position acquiring unit 41 acquires the respective positions of concurrent input entries at two points on the touch panel 69, the drawing start determination unit 43 determines to start drawing a graphic if a distance between the two points is within a first range. The drawing start determination unit 43 may determine to start drawing a graphic if the distance between the two points is within a first range and the input positions of the two points are located within a second range from a cursor that is displayed on a screen of the display device 68.

While the input entries at two points continues to be input after the drawing start determination unit 43 determines to start drawing a graphic, the drawing unit 42 draws a graphic calculated based on the respective movement trajectories of the two points and displays the graphic on the display device 68. In the present embodiment, the drawing unit 42 displays a cursor at a predetermined position near positions on the screen of the display device 68 that correspond to the two points, moves the cursor on the screen in accordance with the movement of the two points, and draws as a graphic the trajectory of a first edge of the cursor on the side further away from the corresponding positions of the two points on the screen of the display device 68. The drawing unit 42 stores the data of the drawn graphic in the data storage unit 60.

When the input of the input entries at the two points ends, the drawing end determination unit 44 determines to end drawing the graphic. The drawing end determination unit 44 may also determine to end drawing the graphic when the distance between the two points exceeds the first range.

The cursor control unit 45 controls the cursor for drawing, which is displayed on the screen of the display device 68. The eraser control unit 46 controls an eraser for deleting a graphic that has been drawn. The canvas control unit 47 controls a canvas for drawing a graphic. A description will be given later in reference to figures regarding these functions.

Figure 4:
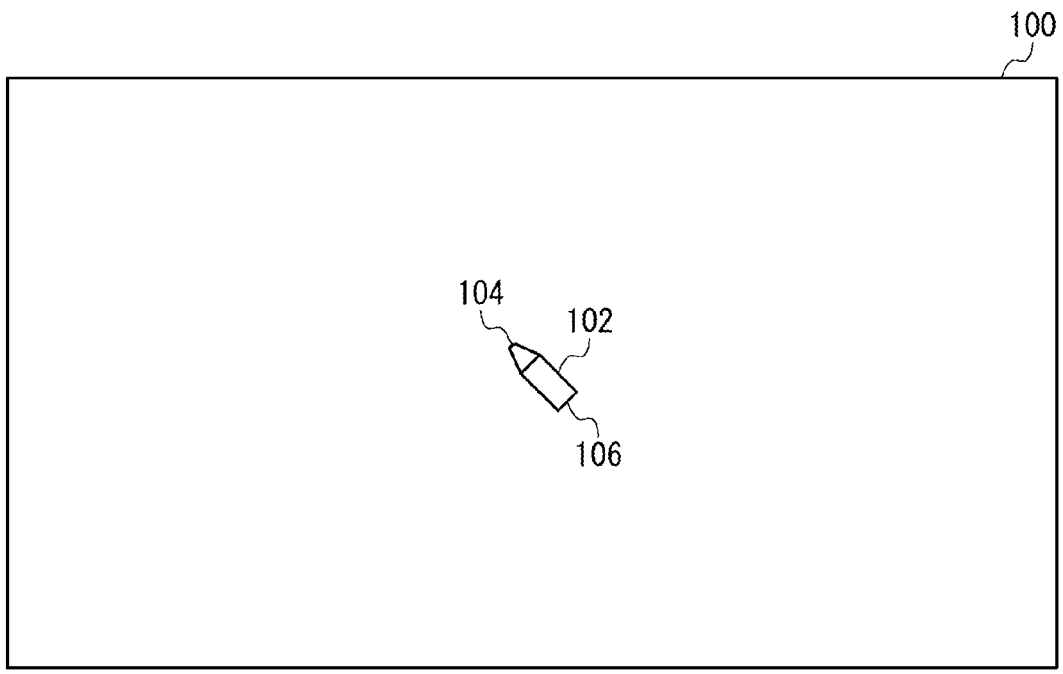
FIG. 4 is a diagram illustrating an example of a screen image displayed on a display device according to a first embodiment.

FIG. 4 illustrates an example of a screen image displayed on the display device. A pen-shaped cursor 102 is displayed on a screen 100. An edge 104 of the cursor 102 on the drawing side has a shape of a pen tip and is changed in accordance with the thickness of a drawing line selected by the user. An edge 106 of the cursor 102 on the other side is thick enough for the user to hold the cursor 102 easily with two fingers.

Figure 5:
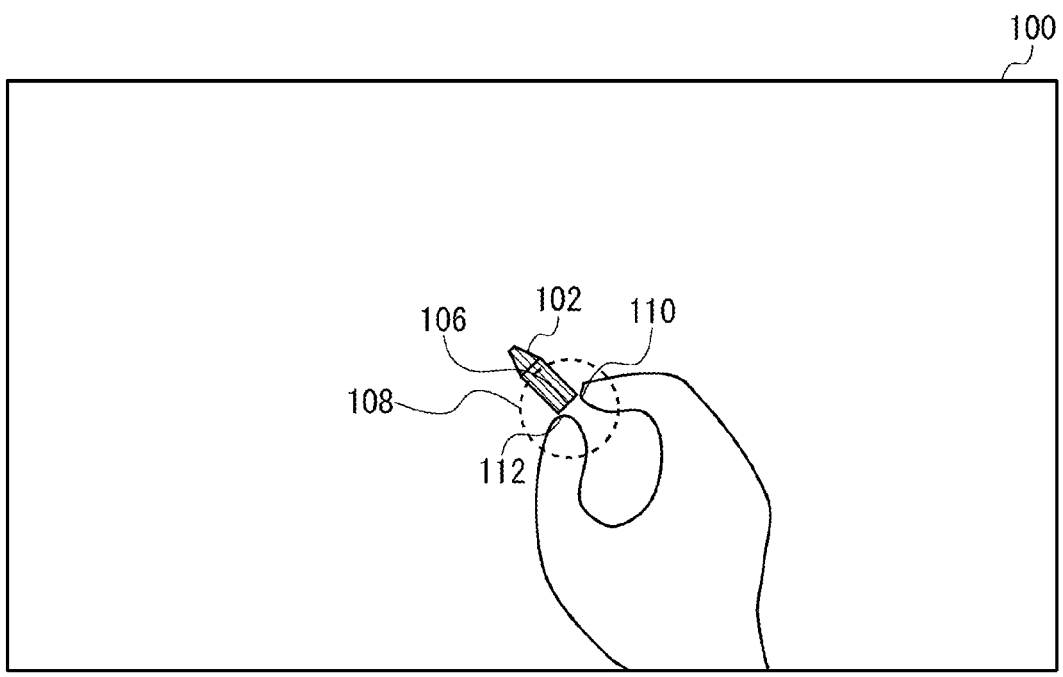
FIG. 5 is a diagram illustrating an example of a screen image displayed on the display device.

FIG. 5 illustrates an example of a screen image displayed on the display device. When the user touches the touch panel 69 with two fingers at a position corresponding to the display position of the cursor 102 such that the input position acquiring unit 41 acquires information indicating that input entries have been input concurrently at two points, the drawing start determination unit 43 determines whether or not to start drawing. If a distance between input positions 110 and 112 of the two points is within the first range, and if the input positions 110 and 112 of the two points are both within a second range 108 from the edge 106 of the cursor 112, the drawing start determination unit 43 determines to start drawing a graphic. In the example shown in FIG. 5, the distance between the input positions 110 and 112 of the two points is within the first range, and the input positions 110 and 112 of the two points are both within the second range 108 from the edge 106 of the cursor 112. Thus, the drawing start determination unit 43 determines to start drawing. In FIG. 5, only a circle indicating the second range 108 is shown, and a circle indicating the first range is not shown in consideration of viewability. The first range may be in about the same distance as that of the second range. When it is determined to start drawing a graphic, the drawing unit 42 changes a display mode of the cursor 102 to be different from a display mode used during a non-drawing period. With this, the user can visually perceive that drawing has started.

Concurrent input entries at two points do not only mean those started to be input at the same time at two points, i.e., those obtained in a case where input operations of touching the touch panel 69 with fingers are conducted at the same time. Even when there is a time difference in the start of inputting the input entries, it is only necessary that there is a period of time when the input entries are being input at the same time at two points. In the present embodiment, a graphic is drawn based on continuous input of input entries at two points. Thus, even when an input entry at one point is input first, drawing may be started if an input entry at another point is input later while the first input entry still continues to be input, as long as the respective positions of these input entries satisfy the conditions required to start drawing.

Figure 6:
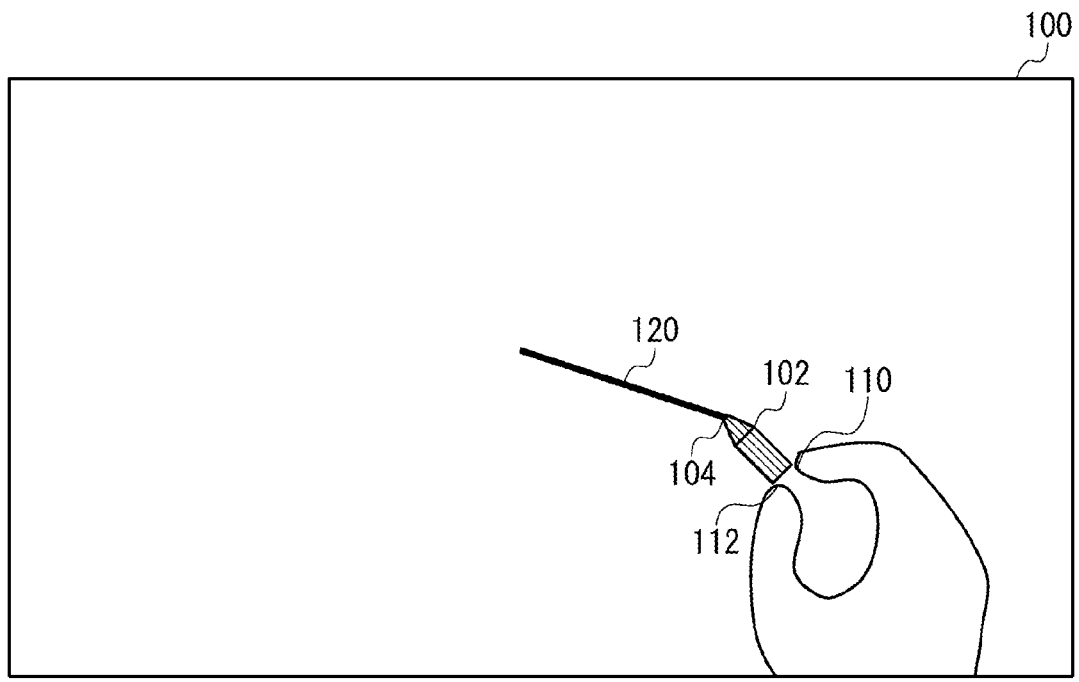
FIG. 6 is a diagram illustrating an example of the screen image displayed on the display device.

FIG. 6 illustrates an example of a screen image displayed on the display device. When the user moves two fingers while touching the touch panel 69 with the fingers, the input positions 110 and 112 of the two points are moved. The drawing unit 42 moves the cursor 102 in accordance with drag input entries at the two points, draws the movement trajectory of the edge 104 of the cursor 102 as a graphic 120, and displays the graphic 120 on the screen 100 at this time. This allows the user to draw a graphic in such a manner as if the user is holding a pen displayed on the screen and moving the pen. Thus, an intuitively user-friendly operating environment can be provided. The input positions 110 and 112 are different from the position of the pen tip at which drawing is carried out. Thus, even in a case of operation performed while touching the touch panel 69 with fingers, a drawing position is not hidden by the fingers, and the user can thus draw a graphic while visually perceiving the drawing position. This allows the user friendliness to be improved.

Figure 7:
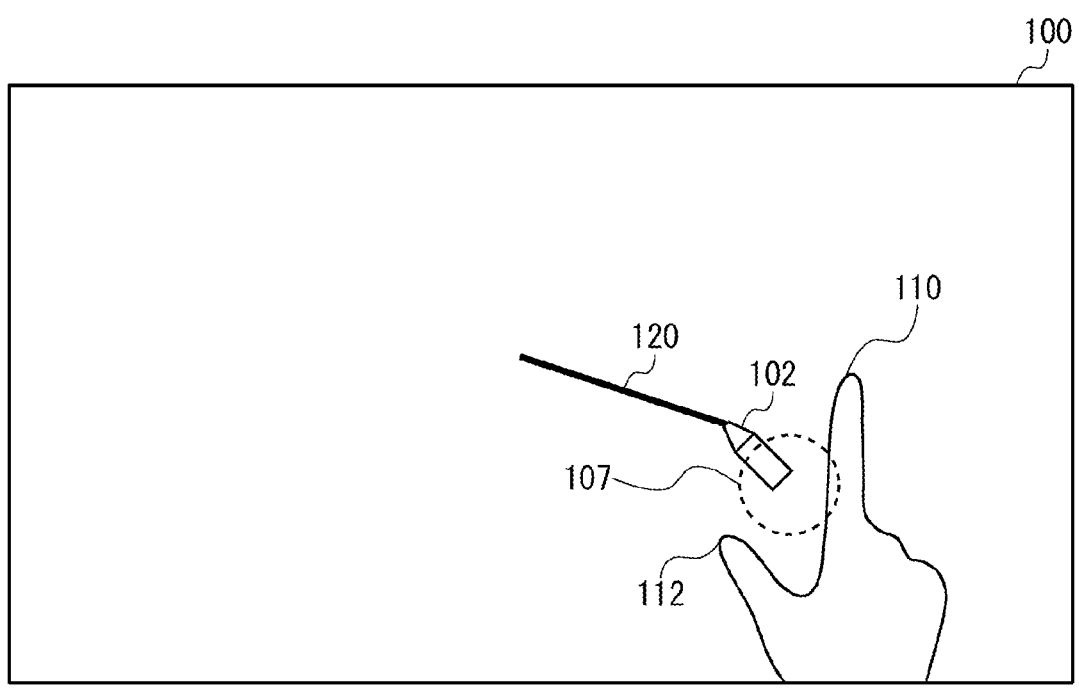
FIG. 7 is a diagram illustrating an example of the screen image displayed on the display device.

FIG. 7 illustrates an example of a screen image displayed on the display device. If the user separate the fingers that have been holding the cursor 102 such that the distance between the input positions 110 and 112 of the two points exceeds a first range 107, the drawing end determination unit 44 determines to end drawing. When the user moves any of the fingers away from the touch panel 69 so as to end inputting an input entry at the input position 110 or 112, the drawing end determination unit 44 determines to end drawing. When it is determined to end drawing, the drawing unit 42 changes the display mode of the cursor 102 back to the display mode used during a non-drawing period.

Figure 8:
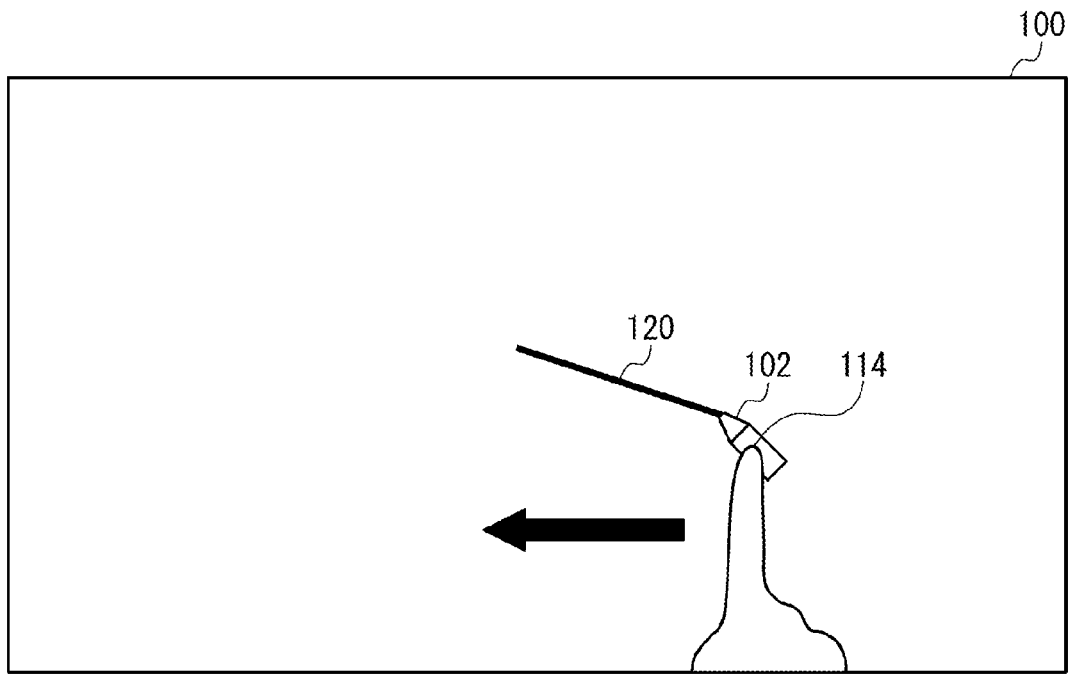
FIG. 8 is a diagram illustrating an example of the screen image displayed on the display device.

FIG. 8 illustrates an example of a screen image displayed on a display device. When the user moves a finger while touching the touch panel 69 with the finger at the position at which the cursor 102 is displayed, the input position 114 of a single point is moved. Since this is not a case of concurrent input entries at two points, the drawing start determination unit 43 does not determine to start drawing at this time.

Figure 9:
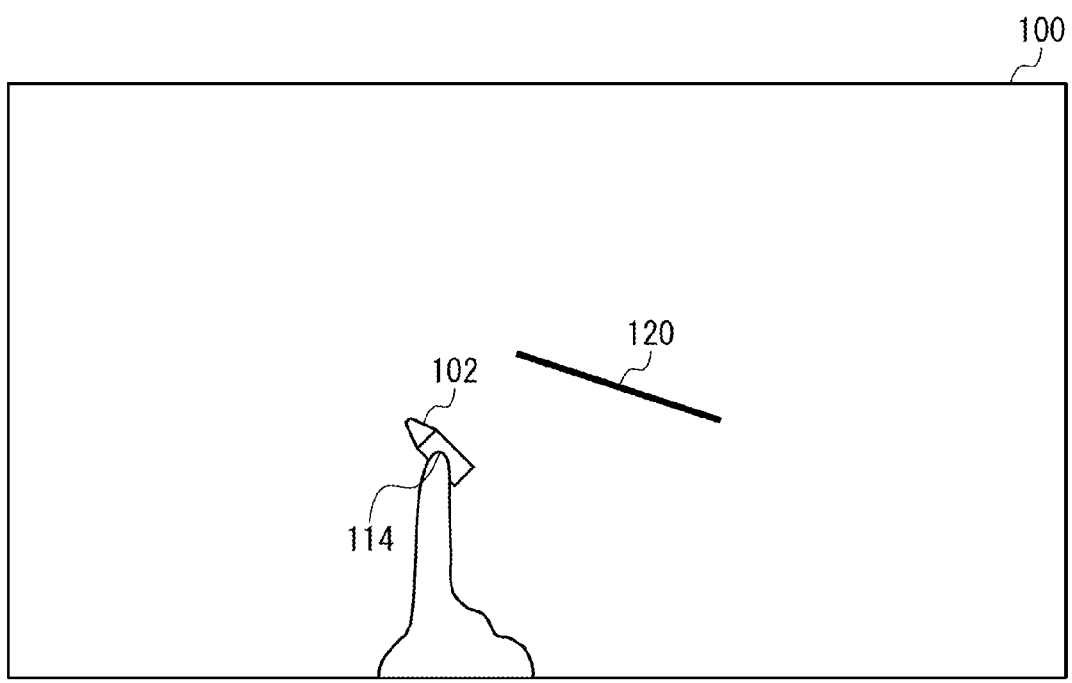
FIG. 9 is a diagram illustrating an example of the screen image displayed on the display device.

FIG. 9 illustrates an example of a screen image displayed on a display device. The cursor control unit 45 moves the cursor 102 in accordance with the movement of the input position 114 of a single point. As described, when the game device 10 according to the present embodiment receives input entries to the screen, the game device 10 presents different functions according to the number of the input entries.

Figure 10:
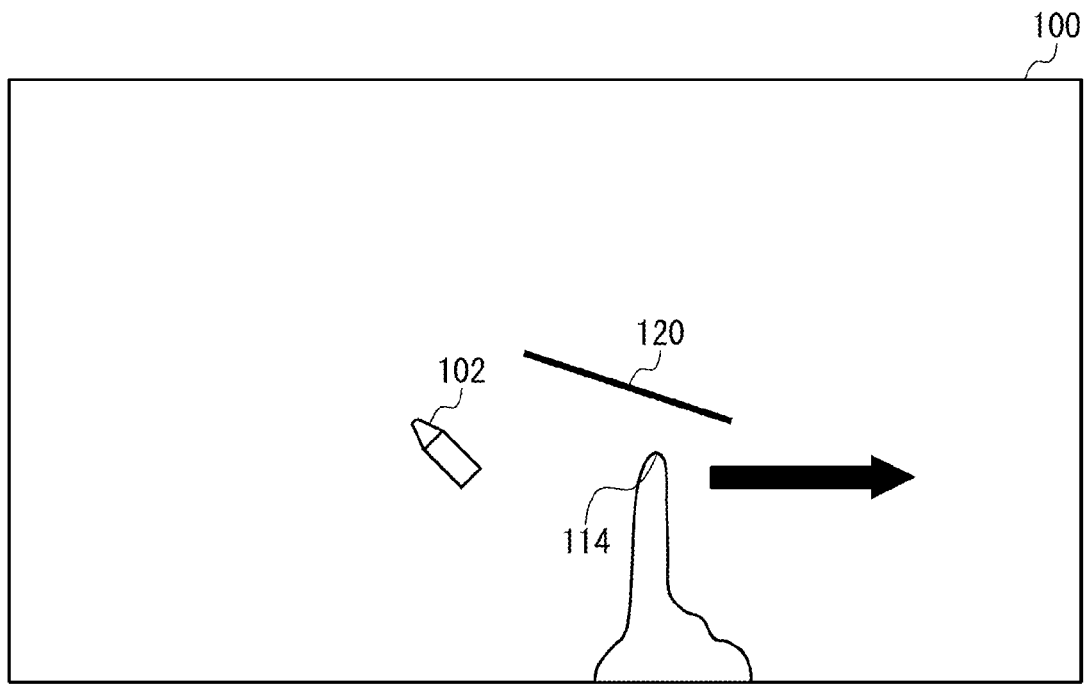
FIG. 10 is a diagram illustrating an example of the screen image displayed on the display device.

FIG. 10 illustrates an example of a screen image displayed on the display device. When the user moves a finger while touching the touch panel 69 with the finger at the position other than where the cursor 102 is displayed, the input position 114 of a single point is moved. Since this is not a case of concurrent input entries at two points, the drawing start determination unit 43 does not determine to start drawing at this time. Since this is not an input entry from a single point at the position of the cursor 102 being displayed, the cursor control unit 45 does not move the cursor.

Figure 11:
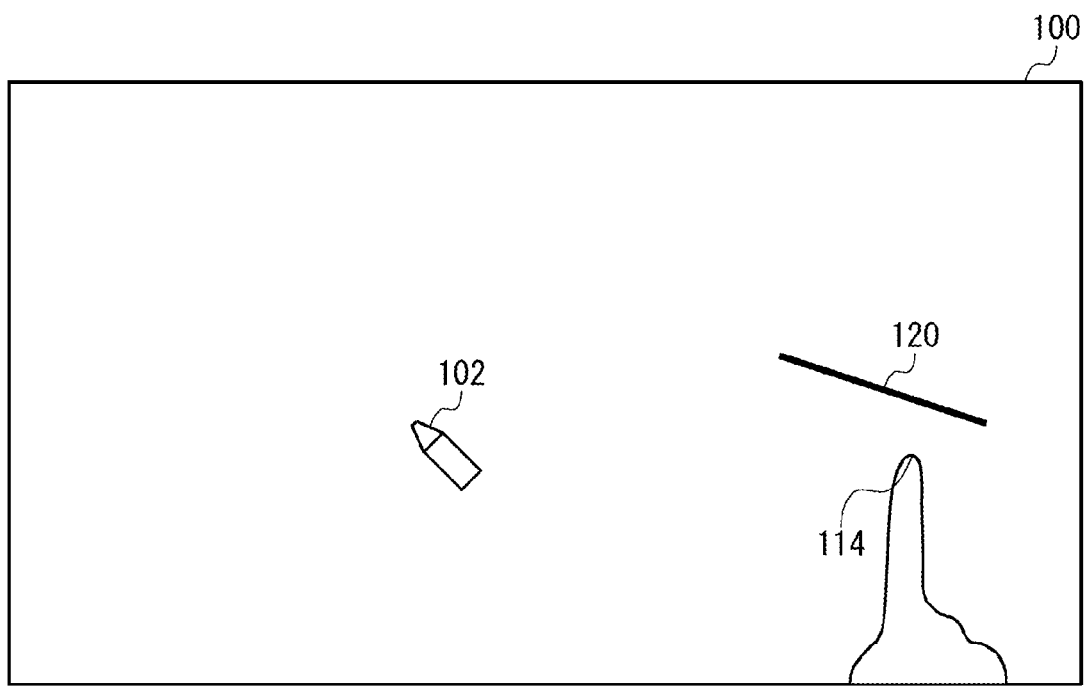
FIG. 11 is a diagram illustrating an example of the screen image displayed on the display device.

FIG. 11 illustrates an example of a screen image to be displayed on the display device. The canvas control unit 47 moves the entire canvas in accordance with the movement of the input position 114 of a single point. In the example shown in FIG. 11, since the entire canvas moves to the right in accordance with the movement of the input position 114 to the right, a graphic 120 also moves to the right. As described, when the game device 10 according to the present embodiment receives an input entry to the screen, the game device 10 presents different functions according to the position of the entry.

The canvas control unit 47 may present a function other than moving the canvas when the canvas control unit 47 acquires an input entry to the canvas. For example, when a drag input entry is received at a position that corresponds to the canvas of the rear touch panel 70, the canvas control unit 47 may rotate the entire canvas in a direction of the drag input entry. The canvas control unit 47 may present a function of changing the thickness, color, type, and the like of the drawing line or changing a drawing mode when input entries to which the above-stated functions are not assigned are received at positions that correspond to the canvas. Such input entries include, e.g., pinch input entries, flick input entries, swipe input entries, tap input entries from three or more points, drag input entries from three or more points, or the like.

Figure 12:
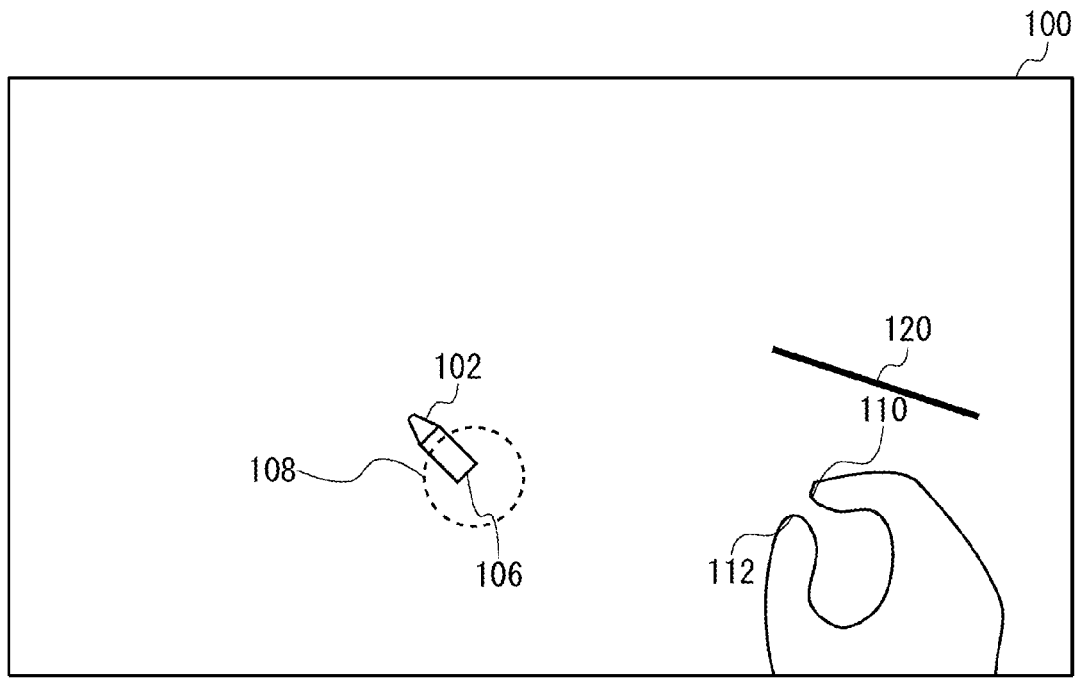
FIG. 12 is a diagram illustrating an example of the screen image displayed on the display device.

FIG. 12 illustrates an example of a screen image displayed on the display device. In an example shown in FIG. 5, the drawing start determination unit 43 determines to start drawing when concurrent input entries are input at two points within the second range 108 from the edge 106 of the cursor 102. In the example shown in FIG. 12, the drawing start determination unit 43 determines to start drawing even when concurrent input entries at two points are input at input positions 110 and 112 that are outside the second range 108 from the edge 106 of the cursor 102.

Figure 13:
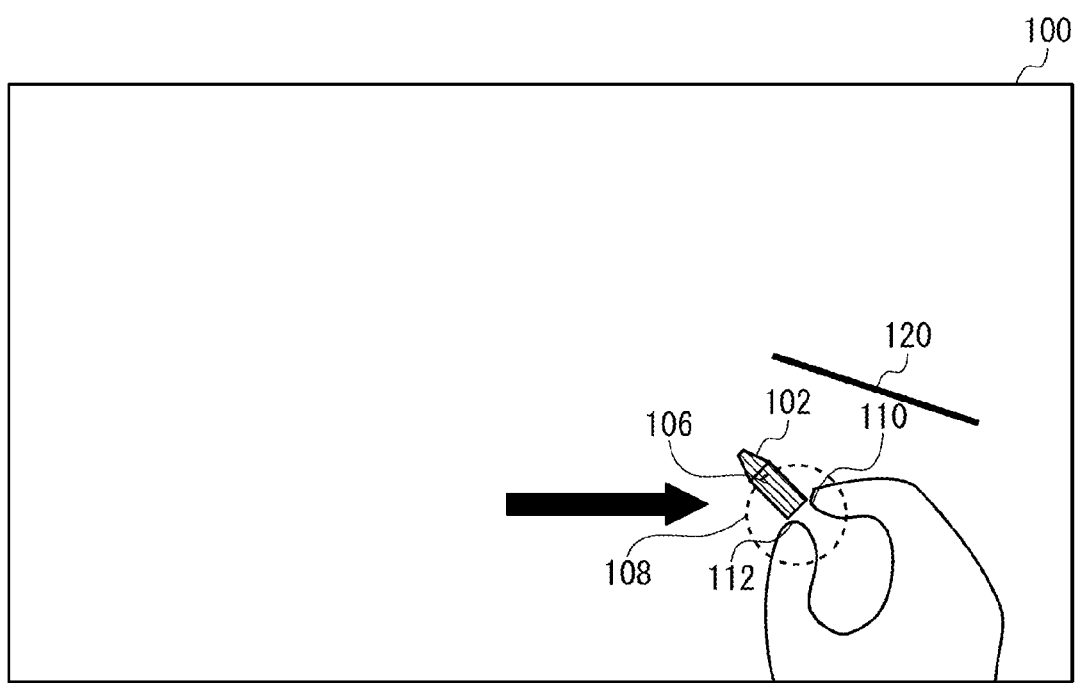
FIG. 13 is a diagram illustrating an example of the screen image displayed on the display device.

FIG. 13 illustrates an example of a screen image displayed on the display device. If there are concurrent input entries that are input at two points at the input positions 110 and 112 away from the second range 108 from the edge 106 of the cursor 102, as shown in the example shown in FIG. 12, the drawing unit 42 moves the cursor 102 such that the edge 106 of the cursor 102 falls within the second range from the input positions 110 and 112 of the two points. This allows the user to start drawing at an arbitrary position on the canvas, and the user-friendliness can thus be improved.

Figure 14:
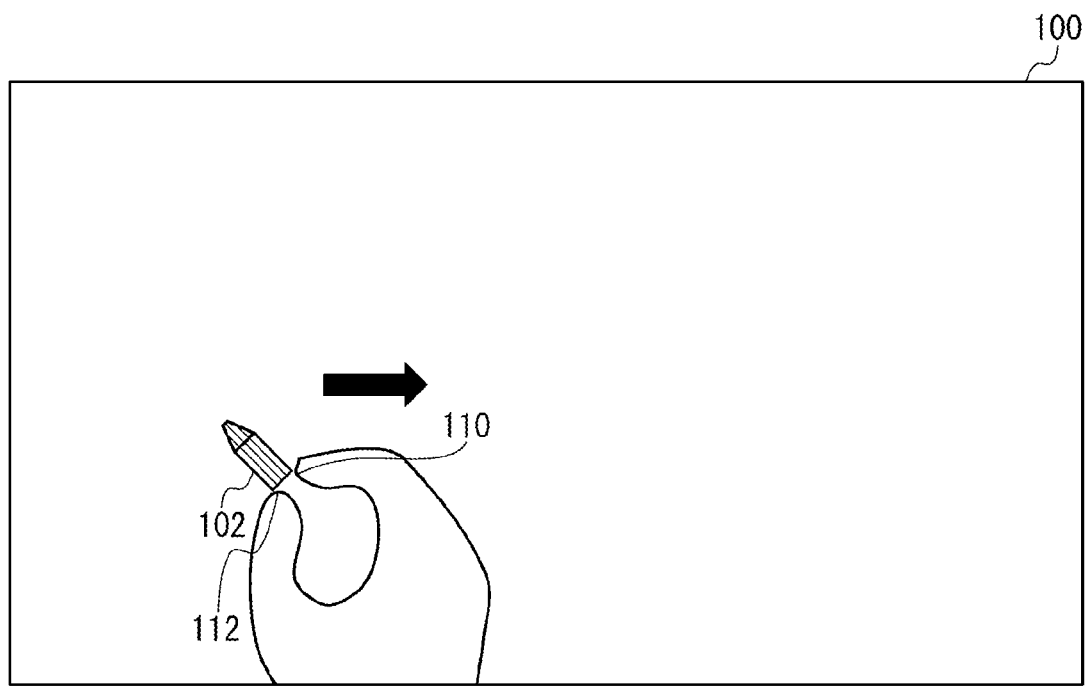
FIG. 14 is a diagram illustrating an example of the screen image displayed on the display device.

FIG. 14 illustrates an example of a screen image displayed on the display device. As shown in FIG. 14, it is assumed that the user has entered flick input with two fingers during drawing. When input positions 110 and 112 are moved at a speed of a predetermined value or more, the input position acquiring unit 41 determines that flick input has been entered at two points.

Figure 15:
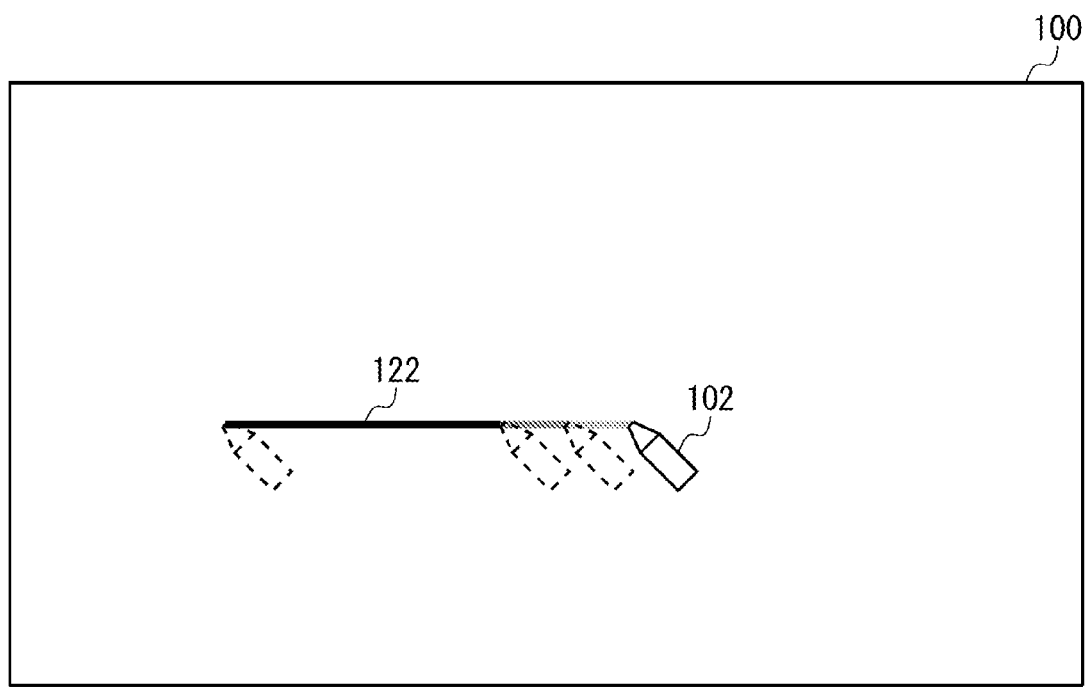
FIG. 15 is a diagram illustrating an example of the screen image displayed on the display device.

FIG. 15 illustrates an example of a screen image displayed on the display device. As shown in FIG. 14, when the user enters flick input with two fingers during drawing, the drawing unit 42 moves, in such a manner as if the cursor 102 is flicked, the cursor 102 from the position at which the entry of the flick input has started to a position that is further away from the position at which the entry of the flick input ends. The drawing unit 42 may draw a part of a graphic 122 that is drawn at the position at which the entry of the flick input ends and at any subsequent positions in such a manner that the part of the graphic 122 gradually becomes faded or narrow.

Figure 16:
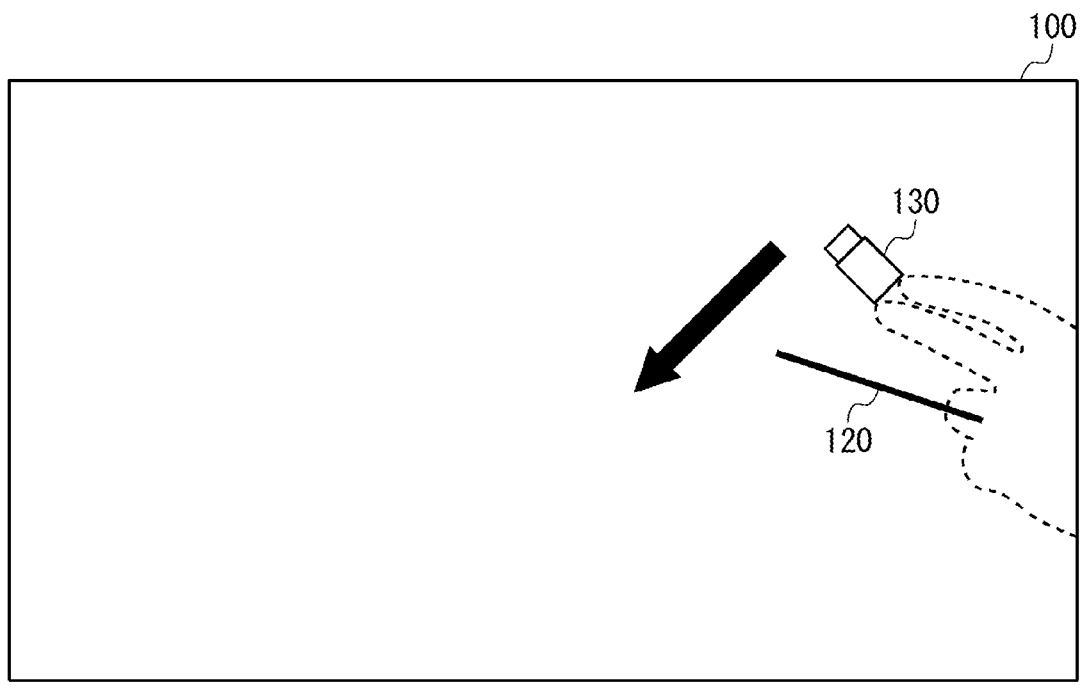
FIG. 16 is a diagram illustrating an example of the screen image displayed on the display device.

FIG. 16 illustrates an example of a screen image displayed on the display device. As shown in FIG. 16, when the input position acquiring unit 41 acquires information indicating that the user has entered input entries concurrently at two points by touching the rear touch panel 70 with two fingers, the eraser control unit 46 displays an eraser 130 near the input position.

Figure 17:
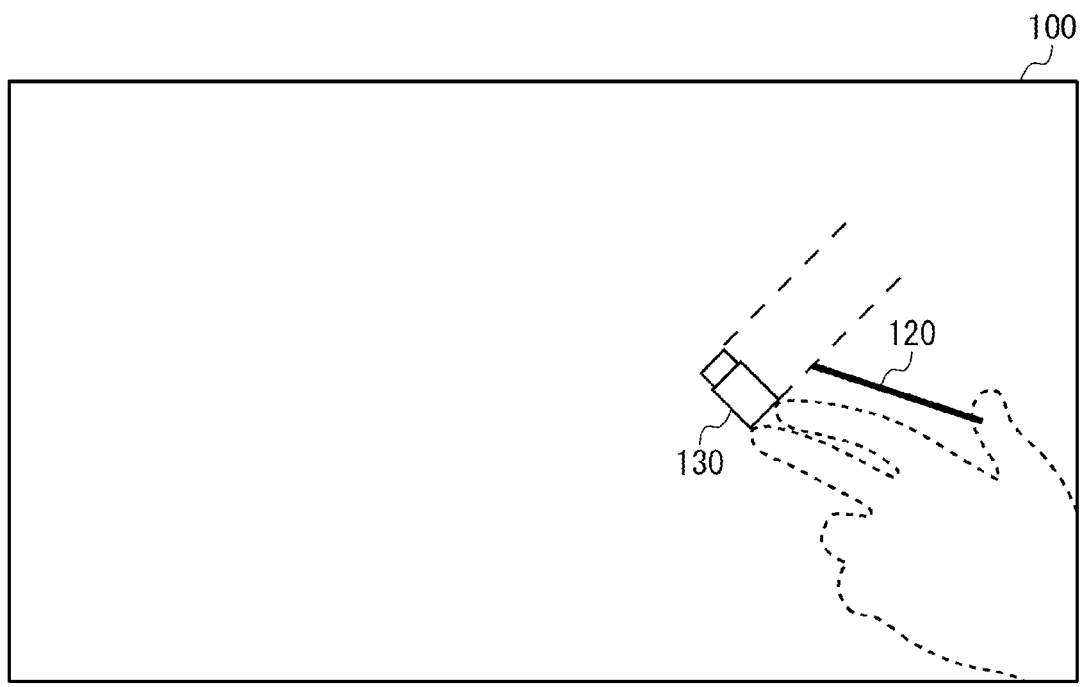
FIG. 17 is a diagram illustrating an example of the screen image displayed on the display device.

FIG. 17 illustrates an example of a screen image displayed on the display device. As shown in FIG. 16, when the user moves two fingers while touching the rear touch panel 70 with the fingers, the input positions of the two points are moved. The eraser control unit 46 moves the eraser 130 in accordance with drag input entries at the two points while deleting a graphic drawn in an area through which the eraser 130 passes and updates the data of the graphic stored in the data storage unit 60 at this time. As described, when deleting a graphic that has been drawn, the user can delete the graphic only by taking his/her hands off the touch panel 69 and then rubbing on the rear touch panel 70 with two fingers at a position that corresponds to a part desired to be deleted. An operation of selecting a tool for deleting the graphic is not needed. This allows the user friendliness to be improved. The eraser control unit 46 may provide a function of displaying the eraser 130 and deleting a graphic in response to input entries to the touch panel 69, e.g., swipe input entries from two or more points.

Figure 18:
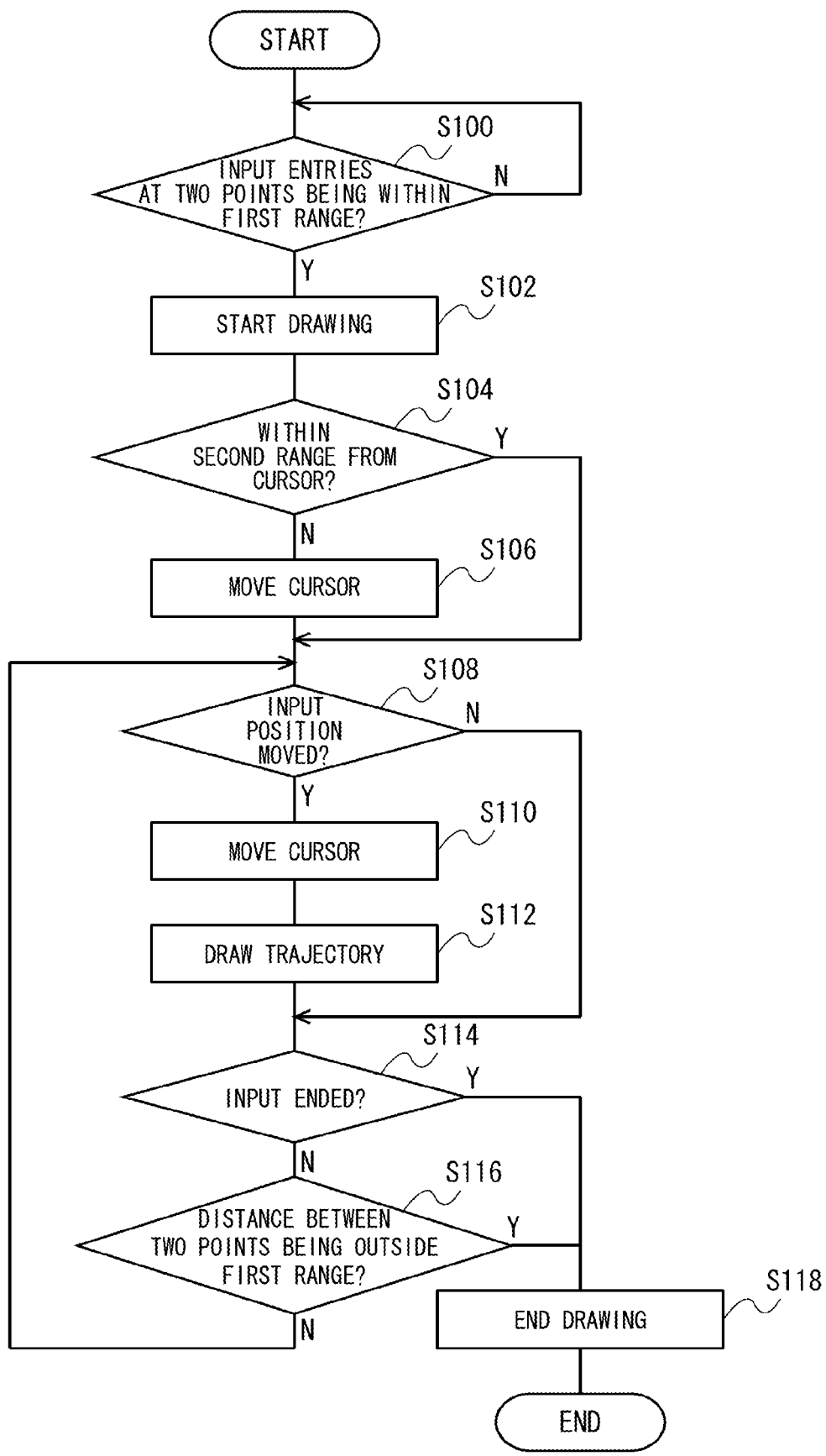
FIG. 18 is a flowchart illustrating the procedure for a drawing control method according to the first embodiment.

FIG. 18 is a flowchart illustrating the procedure for a drawing control method according to the present embodiment. The drawing start determination unit 43 is on stand-by until concurrent input entries at two points, which are apart from each other by a distance within the first range, are input on the touch panel 69 (N in S100). When the input position acquiring unit 41 acquires concurrent input entries at two points that are apart from each other by a distance within the first range (Y in S100), the drawing start determination unit 43 determines to start drawing (S102). When the respective input positions of the two points are not within the second range from the cursor (N in S104), the drawing unit 42 moves the cursor to the position within the second range from the respective input positions of the two points (S106). When the respective input positions of the two points are within the second range (Y in S104), the step S106 is skipped.

When the input positions are moved during drawing (Y in S108), the drawing unit 42 moves the cursor in accordance with the movement of the input positions (S110) and draws the movement trajectory of the edge of the cursor on the drawing side as a graphic (S112). When the input positions are not moved (N in S108), the steps S110 and S112 are skipped. When the input of the input entries at the two points ends (Y in S114) or when the distance between the two points exceeds the first range (Y in S116), the drawing end determination unit 44 determines to end drawing (S118), and drawing is ended. When the input of the input entries at the two points has not ended (N in S114) while the distance between the two points is within the first range (N in S116), the step goes back to the step S108 so as to continue drawing.

Second Embodiment

In a second embodiment, an explanation is given regarding a function of drawing a graphic surrounded by a line connecting the two points and the respective movement trajectories of the two points moved while the user kept touching a touch panel. The configuration of a game device 10 according to the second embodiment is similar to the configuration of the game device 10 according to the first embodiment shown in FIGS. 1, 2, and 3.

Figure 19:
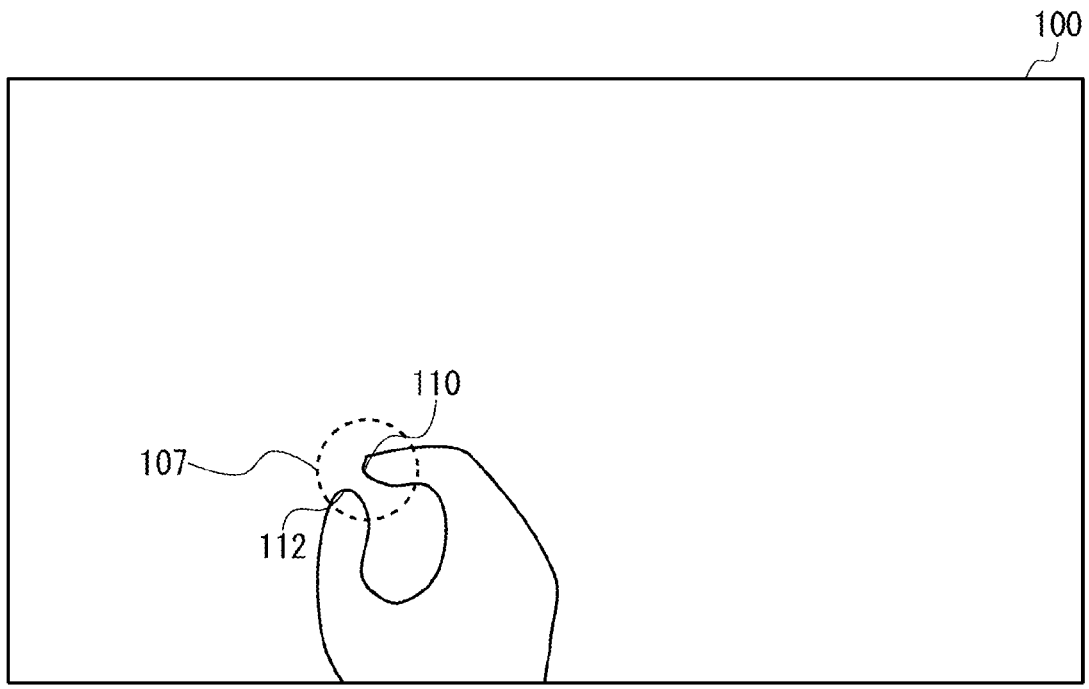
FIG. 19 is a diagram illustrating an example of a screen image displayed on a display device according to a second embodiment.

FIG. 19 is a diagram illustrating an example of a screen image displayed on a display device according to the second embodiment. In the second embodiment, a cursor is not displayed on the screen 100. When the input position acquiring unit 41 acquires concurrent input entries at two points, which are apart from each other by a distance within a first range 107, on the touch panel 69, the drawing start determination unit 43 determines to start drawing.

Figure 20:
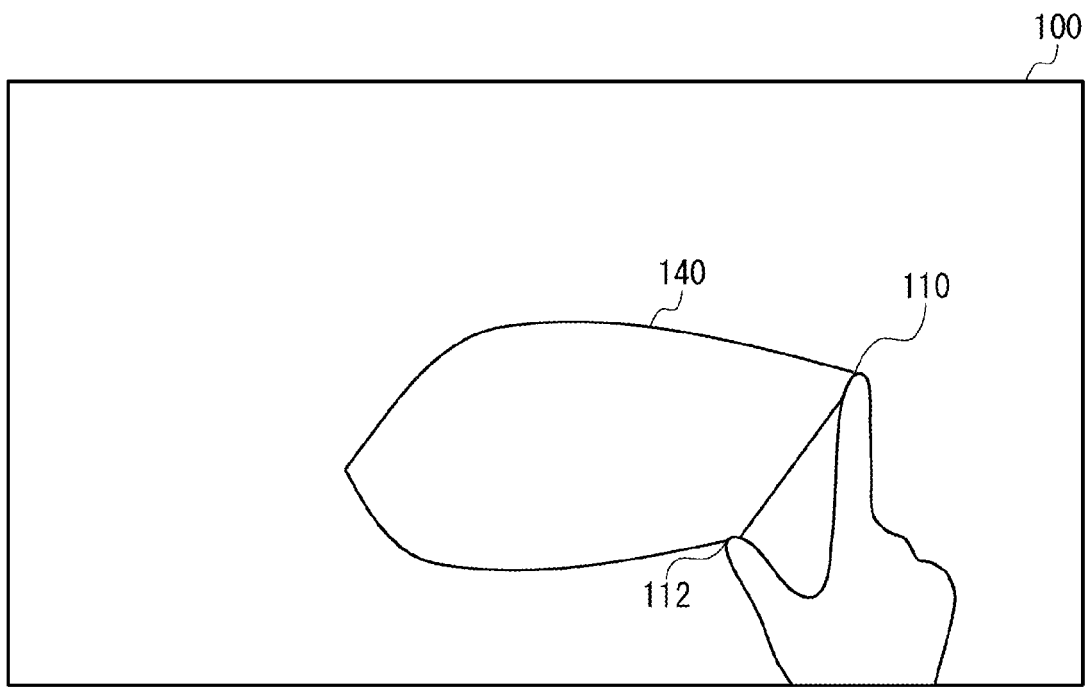
FIG. 20 is a diagram illustrating an example of the screen image displayed on the display device.

FIG. 20 illustrates an example of a screen image displayed on the display device. When the user moves two fingers while touching the touch panel 69 with the fingers, the input positions 110 and 112 of the two points are moved. The drawing unit 42 draws a graphic 140 in accordance with drag input entries at two points. The graphic 140 that is drawn is a graphic surrounded by a line connecting the input positions 110 and 112 of the two points and the respective trajectories of the input positions 110 and 112 of the two points. By adjusting a distance between the two fingers, the user can easily draw a line of a desired thickness or a graphic having a complicated shape. This allows the user friendliness to be improved.

When the input of either one of the input entries at the two points ends, the drawing end determination unit 44 determines to end drawing. In the present embodiment, the drawing end determination unit 44 does not determine to end drawing even when a distance between the two points exceeds the first range. When only the input of either one of the input entries at the two points is ended while the other entry continues to be input, the drawing end determination unit 44 may not determined to end drawing, and the drawing unit 42 may continue drawing.

In the second embodiment, a cursor is not displayed on a screen during drawing, and a position at which the user touches the screen with his/her finger is set to be a drawing position. When a distance between the input positions 110 and 112 of two points becomes less than a predetermined range, the drawing position is hidden by the finger, and it is thus hard to visually perceive the drawing position. Therefore, the drawing unit 42 may display a cursor near the input positions 110 and 112.

Figure 21:
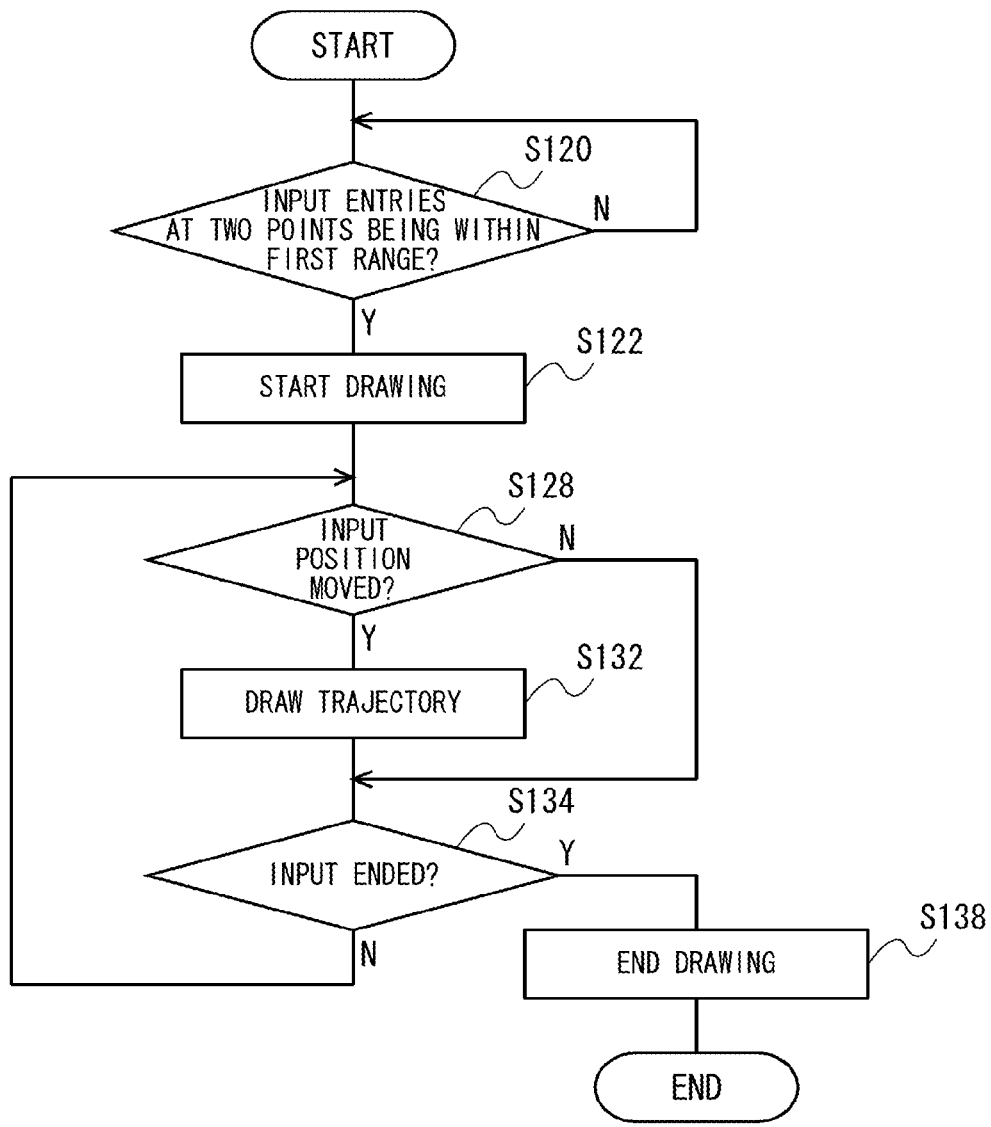
FIG. 21 is a flowchart illustrating the procedure for a drawing control method according to the second embodiment.

FIG. 21 is a flowchart illustrating the procedure for a drawing control method according to the present embodiment. The drawing start determination unit 43 is on stand-by until concurrent input entries at two points, which are apart from each other by a distance within the first range, are input on the touch panel 69 (N in S120). When the input position acquiring unit 41 acquires concurrent input entries at two points that are apart from each other by a distance within the first range (Y in S120), the drawing start determination unit 43 determines to start drawing (S122).

When the input positions are moved during drawing (Y in S128), the drawing unit 42 draws a graphic surrounded by the respective movement trajectories of the two points and a line connecting the two points (S132). When the input positions are not moved (N in S128), the step S132 is skipped. When the input of the input entries at the two points ends (Y in S134), the drawing end determination unit 44 determines to end drawing (S138), and drawing is ended. When the input of the input entries at the two points has not ended (N in S134), the step goes back to the step S128 so as to continue drawing.

Described above is an explanation based on the exemplary embodiments of the present invention. These exemplary embodiments are intended to be illustrative only and it will be obvious to those skilled in the art that various modifications to constituting elements and processes could be developed and that such modifications are also within the scope of the present invention.

A drawing device according to the present invention may have both the drawing function according to the first embodiment and the drawing function according to the second embodiment. The drawing device may present a menu, a palette, or the like for switching the drawing functions and receive an instruction for switching the drawing functions from the user. The drawing device may store the position of a pen-shaped cursor when the drawing function according to the first embodiment is switched to the drawing function according to the second embodiment so that the drawing device reads out the stored position of the pen-shaped cursor and displays the pen-shaped cursor at the position when the drawing function is switched back again to the drawing function according to the first embodiment.

What is claimed is:

1. A drawing control program embedded on a non-transitory computer-readable recording medium, the drawing control program allowing a computer to function as:
   an acquiring unit configured to acquire the position of an input entry to an input device capable of concurrently detecting input entries at a plurality of points;
   a drawing start determination unit configured to determine, when the acquiring unit acquires the respective positions of concurrent input entries to the input device at two points that are start points, that drawing of a graphic is to be started if a distance between the two points is within a first range,
   wherein the graphic is a newly created graphic;
   a drawing unit configured to draw, while the input entries at the two points continue to be input after the drawing start determination unit determines that drawing of a graphic is to be started, a graphic calculated based on the respective movement trajectories of the two points and to display the graphic on a display device; and
   a drawing end determination unit configured to determine that drawing of the graphic is to be ended when the input of the input entries at the two points ends that are end points,
   wherein a start point and an end point of the graphic are determined by the start points and end point of the input entries.

2. The drawing control program according to claim 1, wherein the drawing unit displays a cursor at a predetermined position near corresponding positions of the two points on a screen of the display device, moves the cursor on the screen in accordance with the movement of the two points, and draws the trajectory of a first edge of the cursor as the graphic, the first edge being on the side further away from the corresponding positions of the two points on the screen of the display device.

3. The drawing control program according to claim 2, wherein the drawing start determination unit determines that drawing of a graphic is to be started when the distance between the two points is within a first range and when the two points are located within a second range from a second edge of the cursor, the second edge being on the opposite side from the first edge.

4. The drawing control program according to claim 2, wherein, when the two points are not located within a second range from a second edge of the cursor that is on the opposite side from the first edge, the drawing unit moves the cursor such that the second edge of the cursor falls within the second range from the two points.

5. The drawing control program according to claim 2, wherein the drawing end determination unit ends the drawing of the graphic when the distance between the two points exceeds the first range.

6. The drawing control program according to claim 3, wherein the drawing end determination unit ends the drawing of the graphic when the distance between the two points exceeds the first range.

7. The drawing control program according to claim 4, wherein the drawing end determination unit ends the drawing of the graphic when the distance between the two points exceeds the first range.

8. The drawing control program according to claim 2, wherein, when the acquiring unit acquires a drag input entry at a single point starting within a predetermined range from a position on the input device that corresponds to the position of the cursor, the acquiring unit moves the cursor in accordance with the drag input entry.

9. The drawing control program according to claim 3, wherein, when the acquiring unit acquires a drag input entry at a single point starting within a predetermined range from a position on the input device that corresponds to the position of the cursor, the acquiring unit moves the cursor in accordance with the drag input entry.

10. The drawing control program according to claim 4, wherein, when the acquiring unit acquires a drag input entry at a single point starting within a predetermined range from a position on the input device that corresponds to the position of the cursor, the acquiring unit moves the cursor in accordance with the drag input entry.

11. The drawing control program according to claim 5, wherein, when the acquiring unit acquires a drag input at a single point starting within a predetermined range from a position on the input device that corresponds to the position of the cursor, the acquiring unit moves the cursor in accordance with the drag input entry.

12. The drawing control program according to claim 1, wherein the drawing unit draws a graphic surrounded by a line connecting the two points and the respective trajectories of the two points.

13. The drawing control program according to claim 1, allowing a computer to further function as a deletion control unit configured to delete, when the acquiring unit acquires swipe input entries that are input at a predetermined number of points on the input device, a graphic displayed at a position on a screen of the display device that corresponds to an area at which the swipe input entries have been input.

14. The drawing control program according to claim 2, allowing a computer to further function as a deletion control unit configured to delete, when the acquiring unit acquires swipe input entries that are input at a predetermined number of points on the input device, a graphic displayed at a position on a screen of the display device that corresponds to an area at which the swipe input entries have been input.

15. The drawing control program according to claim 12, allowing a computer to further function as a deletion control unit configured to delete, when the acquiring unit acquires swipe input entries that are input at a predetermined number of points on the input device, a graphic displayed at a position on a screen of the display device that corresponds to an area at which the swipe input entries have been input.

16. The drawing control program according to claim 1, wherein the input device includes a front touch panel provided on a screen of the display device or a rear touch panel provided on a surface that is on the opposite side of the display device.

17. A drawing device comprising:
- an acquiring unit configured to acquire the position of an input entry to an input device capable of concurrently detecting input entries at a plurality of points;
- a drawing start determination unit configured to determine, when the acquiring unit acquires the respective positions of concurrent input entries to the input device at two points that are start points, that drawing of a graphic is to be started if a distance between the two points is within a first range,
- wherein the graphic is a newly created graphic;
- a drawing unit configured to draw, while the input entries at the two points continue to be input after the drawing start determination unit determines that drawing of a graphic is to be started, a graphic calculated based on the respective movement trajectories of the two points and to display the graphic on a display device; and
- a drawing end determination unit configured to determine that drawing of the graphic is to be ended when the input of the input entries at the two points ends that are end points,
- wherein a start point and an end point of the graphic are determined by the start points and end point of the input entries.

18. A drawing control method comprising:
- acquiring the position of an input entry to an input device capable of concurrently detecting input entries at a plurality of points;
- determining, when acquiring the respective positions of concurrent input entries to the input device at two points that are start points, that drawing of a graphic is to be started if a distance between the two points is within a first range,
- wherein the graphic is a newly created graphic;
- drawing, while the input entries at the two points continue to be input after determining that drawing of a graphic is to be started, a graphic calculated based on the respective movement trajectories of the two points and displaying the graphic on a display device; and
- determining that drawing of the graphic is to be ended when the input of the input entries at the two points ends that are end points,
- wherein a start point and an end point of the graphic are determined by the start points and end point of the input entries.

* * * * *

UNITED STATES PATENT AND TRADEMARK OFFICE
CERTIFICATE OF CORRECTION

PATENT NO. : 9,274,702 B2  
APPLICATION NO. : 13/609506  
DATED : March 1, 2016  
INVENTOR(S) : Masaomi Nishidate Page 1 of 1

It is certified that error appears in the above-identified patent and that said Letters Patent is hereby corrected as shown below:

Title page, item (73) should read as follows:

(73) Assignees: Sony Corporation, Tokyo (JP)  
Sony Computer Entertainment, Inc., Tokyo (JP)

Signed and Sealed this  
Fourteenth Day of June, 2016

Michelle K. Lee  
*Director of the United States Patent and Trademark Office*